(12) United States Patent
Castagna et al.

(10) Patent No.: US 12,020,248 B2
(45) Date of Patent: Jun. 25, 2024

(54) PAYMENT REDEMPTION USING NON-FUNGIBLE TOKENS

(71) Applicant: Bank of America Corporation, Charlotte, NC (US)

(72) Inventors: Brandon Castagna, Charlotte, NC (US); Lisa Pugh, Charlotte, NC (US); Mei Lin, Addison, TX (US); Alfred Reed, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/863,801

(22) Filed: Jul. 13, 2022

(65) Prior Publication Data

US 2024/0020692 A1    Jan. 18, 2024

(51) Int. Cl.
*G06Q 20/40* (2012.01)
*G06Q 20/06* (2012.01)
*G06Q 20/36* (2012.01)

(52) U.S. Cl.
CPC ........... *G06Q 20/40* (2013.01); *G06Q 20/065* (2013.01); *G06Q 20/36* (2013.01)

(58) Field of Classification Search
CPC ...... G06Q 20/065; G06Q 20/36; G06Q 20/65; G06Q 20/40

USPC .......................................................... 705/44
See application file for complete search history.

(56) References Cited

U.S. PATENT DOCUMENTS

| | | | |
|---|---|---|---|
| 2018/0211340 A1* | 7/2018 | Cook | G06Q 20/042 |
| 2019/0340946 A1* | 11/2019 | Elmessiry | G06Q 20/3678 |
| 2021/0090066 A1* | 3/2021 | Beye | G06Q 20/02 |
| 2021/0226777 A1* | 7/2021 | Wilson | H04L 9/0861 |
| 2022/0006651 A1* | 1/2022 | Soundararajan | H04W 12/069 |
| 2022/0138705 A1* | 5/2022 | Wright | G06Q 20/065 705/39 |
| 2022/0294629 A1* | 9/2022 | Collen | G06Q 30/06 |
| 2023/0080599 A1* | 3/2023 | Rose | G06Q 20/36 705/75 |

* cited by examiner

*Primary Examiner* — Hai Tran
(74) *Attorney, Agent, or Firm* — Weiss & Arons LLP (57) ABSTRACT

Apparatus and methods for utilizing non-fungible tokens ("NFTs") for payment redemption and remittances are provided. A payor may use a computer program product to create an NFT. The NFT may include a digital envelope and metadata. The digital envelope may include one or more payment terms as a payment statement and the payment funds. The NFT may be transferred to a digital wallet belonging to a payee. The payee may select an option to redeem the payment funds. The payment funds may be transferred to the payee per the selection.

20 Claims, 6 Drawing Sheets

PAYMENT REDEMPTION USING NON-FUNGIBLE TOKENS

FIELD OF TECHNOLOGY

Aspects of the disclosure relate to providing apparatus and methods for utilizing non-fungible tokens ("NFTs") for payments and payment redemption.

BACKGROUND OF THE DISCLOSURE

Existing payment remittances are generally bifurcated into two parts: a statement and a payment. These two parts may be sent in two separate transmissions or transactions. The statement may include information such as the payor, the amount, a memo on what the payment is for, the date, and other information. The payment may be in the form of a paper check, electronic check, cash, or other medium (fungible or non-fungible).

Bifurcating the payment and the statement creates excess paper and other waste and may allow for the information in the statement to be misplaced or lost by the payee or others. In addition, sending the statement and payment in two transmissions or transactions doubles the opportunities for a malicious actor to intercept or create havoc with a payment.

Transmitting a payment statement and payment funds together in one digital transaction may be useful for multiple reasons. For example, a single digital transaction/document may be more easily transferable between a payor, payee, and third parties. A single digital transaction/document may be used as collateral or proof of a loan. A single digital transaction/document may provide an alternate to standard commercial paper. A single transaction/document may be sent digitally (e.g., in an email) including the payment funds. A single digital transaction/document may be converted into multiple formats for flexible use.

In addition, if a distributed ledger or blockchain is utilized for the digital transaction, counterparty risk may be eliminated as the information is permanently available and immutable/unchangeable. Further, the statement may be permanently stored and accessible at any time while it is stored on the distributed ledger or blockchain. This may allow the payee to retain the payment information from a statement long after money has been utilized.

Therefore, it would be desirable for apparatus and methods for bundling and transmitting the statement and payment together. NFTs may provide one tool for payment redemption with a statement and payment together.

SUMMARY OF THE DISCLOSURE

It is an object of this disclosure to provide apparatus and methods for utilizing non-fungible tokens ("NFTs") for payments and payment redemption.

A payment redemption computer program product for remitting a payment and a statement together is provided. The computer program product may include executable instructions that may be executed by a processor (or processors) on a computer system. The executable instructions may be stored in non-transitory memory on the computer system or a remote computer system, such as a server.

The program may receive, from a payor, one or more payment terms. The one or more payment terms may include an identity of the payor, an identity of the payee, an amount of the payment, a location of one or more assets comprising the payment, one or more options to convey the payment selectable by the payee, as well as other terms.

The program may create a non-fungible token ("NFT"). The NFT may include metadata and a digital envelope. The NFT may be singular. The initial location of the NFT may be within a payor distributed ledger wallet belonging to the payor. The payor wallet may be an address on a distributed ledger belonging to the payor. The digital envelope may include data including the one or more payment terms as well as the actual funds that make up the payment.

After receiving an authorization to transmit the NFT (and/or release the payment) from the payor, the program may transfer the NFT to a payee distributed ledger wallet belonging to a payee. The program may confirm receipt of the NFT at the payee distributed ledger wallet. The program may then convey the payment as instructed by the payee.

In an embodiment, one or more of the one or more payment terms or other data within the NFT may be encrypted. In an embodiment, the part of or all of the entire NFT may be encrypted.

In an embodiment, the payee distributed ledger wallet and the payor distributed ledger wallet may be located on the same distributed ledger. This may decrease transaction costs of transmitting NFTs between different distributed ledgers.

In an embodiment, the distributed ledger may be a blockchain.

In an embodiment, the one or more payment terms may be accessed through a hyperlink within the NFT. For example, the NFT may simply contain a link (hyperlink or otherwise) to the data, instead of, or in addition to including the data within the NFT itself.

In an embodiment, the NFT, and/or the data included within the NFT, may be machine-readable.

In an embodiment, the payment redemption computer program and/or the NFT may transmit a report to the payor when certain conditions are met. These conditions may include, singularly or in any combination, inter alia: 1) the digital envelope being viewed (by the payor, the payee, or others); 2) the payment being conveyed to the payee; 3) the failure of the payee to select an option to convey the payment within a pre-determined amount of time.

In an embodiment, the metadata within the NFT may include a record of where the NFT has been located on the distributed ledger.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

It is an object of this disclosure to provide apparatus and methods for utilizing distributed ledgers and non-fungible tokens ("NFTs") for payments and payment redemption.

Distributed ledger technology may refer to a decentralized, tamperproof, and transactional database. A distributed ledger may provide a distributed, immutable, transparent, secure, and auditable ledger of transactions. The distributed ledger may provide a secure way to store and process transactions among trusted and untrusted nodes on a network.

The distributed ledger may be a public or un-permissioned distributed ledger. A public distributed ledger may not have restrictions on who may participate in establishing a consensus for adding a new record. For example, records stored in a public distributed ledger may only be added to the ledger when systems that rely on the distributed ledger reach a consensus. The distributed ledger may use any suitable consensus algorithm such as Proof of Work, Proof of Stake or Practical Byzantine Fault Tolerance.

The distributed ledger may be a private or permissioned distributed ledger. A private distributed ledger may include restrictions on who may participate in establishing a consensus for adding a new record.

The distributed ledger may utilize a combination of private and public participation to establish a consensus. For example, the distributed ledger may require a threshold number of private and/or public agreements before recording a transaction on the distributed ledger. Utilization of private entities may allow for achieving a consensus (or rejection) of a transaction faster than wholly public distributed ledgers.

The program may record one or more payment terms associated with a payment in a distributed ledger. Illustrative payment terms may include a type of currency (e.g., USD, EUR, AUD, GBP, JPY, CAD), an amount of currency, the payer's digital wallet and the payee's digital wallet.

The distributed ledger may include a protocol that allows transactions to be verified by unreliable nodes. The distributed ledger can be consulted openly and fully, allowing access to all transactions that have occurred since the first transaction of the system, and can be verified and collated by any entity at any time. The distributed ledger also stores transactional information in a fashion that prevents alteration of the records stored in the distributed ledger. Therefore, if the ledger states that a particular token belongs to a particular wallet, and the movement of the token can be traced from the moment it first appeared in the ledger, that data may be trusted and may be used for various purposes.

The distributed ledger may store information in linked segments, or a chain of "blocks." The linked blocks may collectively form a "blockchain." Each block may store a set of transactions performed at a given time. Blocks are linked or chained to each other by a reference to the previous block. Each block in the distributed ledger is linked to the previously approved block using a cryptographic hash code of the previous block.

Distributed ledger security may be accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

A key component of the consensus mechanism may be proof of work. In one embodiment of a distributed ledger, each node must successfully solve a computationally intensive task before adding a new block to the distributed ledger. The proof of work must be complex to solve and at the same time easily verifiable once completed. This dichotomy ensures that only one node is authorized to add a new block and that all other nodes can easily verify that the new block has been properly linked to a prior block. The computationally intensive nature of the block generation process provides tamperproof and auditable transactional database. Alternatively, a more recent paradigm is proof of stake in lieu of proof of work. Proof of stake may be less energy intensive and faster computationally. Other, known and unknown, methods of ensuring a distributed ledger's validity may be used as well as proof of work or proof of stake.

It may be computationally expensive for a malicious attacker to modify a block and attempt to corrupt its contents. The rest of the trusted nodes on the network would continuously generate new blocks, outrunning the attacker in the block generation process. Therefore, a trusted branch of blocks will grow faster than any blocks that can be generated by the attacker. Nodes on a network are programmed to recognize the longest chain in the network as the authoritative source of information. The nodes on the network will therefore invalidate any shorter chains generated by the attacker.

In order for a manipulated block to be successfully added to the distributed ledger, it would be necessary for the malicious attacker to solve the proof of work faster than the rest of nodes on the network. This is structured to be computationally too expensive for the attacker. Accomplishing this feat requires having control of at least 51% of the computing resources in the network.

A transaction or block may be referred to as a token. A token may also be a representation of data included within a transaction or block. Generally, a token is a unit of data stored on distributed ledger. The token may include unique data. The data may be hashed, creating a unique hash. A token may also represent data or information outside of a transaction or block, as in, for example, cryptocurrencies such as Ethereum or Bitcoin. Tokens may be fungible. Tokens may be non-fungible. Fungible tokens, such as cryptocurrencies, are interchangeable. Non-fungible tokens ("NFTs") may be unique and singular (or in limited quantities) and are non-interchangeable. Distributed ledger technology may be used to provide and verify public proof of ownership of tokens. While all units (copies, or tokens) of a particular cryptocurrency may be mutually interchangeable (and thus fungible), non-fungible tokens are not mutually interchangeable. Currently, distributed ledgers may be used to verify ownership of tokens.

NFTs may commonly be used to tokenize specific digital data, such as artwork, or legacy code, or some other digital data. However, nothing limits NFTs to tokenizing artwork or other typical data.

Distributed ledgers may use security methods such as public-key cryptography. A public key may be a long, random-looking string of numbers or other intensive data. The public key may function as a computerized address on the ledger, belonging to a particular user. The address may include a computerized wallet that may contain data or information belonging to the user, along with assets belonging to the user. Units of data, such as tokens, sent across the ledger may be recorded as belonging to that address. Along with the public key, a user may have a private key, which may be linked to the public key. A private key may function as a password that gives the user access to her address and wallet and allow the user to interact with the distributed ledger.

Distributed ledgers may be centralized or decentralized. In a centralized ledger, a server, or group of servers, may maintain the authoritative copy of the ledger, and any node interacting with the ledger (to view or update) may have to be approved by the server or servers. However, in in a decentralized system, every node may have a copy of the ledger and no centralized or official copy of the ledger may exist.

Distributed ledgers/blockchains may be public or private (i.e., conclave or permissioned). Private ledgers may use an access control layer to determine who has access to the ledger to view or add to the ledger.

Distributed ledger smart contracts are code or programs on the ledger that may be partially or fully started, executed, or enforced without human interaction. As long as the parties to a smart contract understand what the smart contract will and will not do, actions taken by the smart contract may be binding on the parties.

A payment redemption computer program product for remitting a payment and a statement together is provided. Typically, payments and statements are remitted separately, in two transactions or transmissions. (For example, with a paper payment, the payment might be a physical check, while the statement, although attached to the check, is a separate paper with additional information.)

The computer program product may include executable instructions that may be executed by a processor (or processors) on a computer system. Multiple processors may increase the speed and capability of the program. The executable instructions may be stored in non-transitory memory on the computer system or a remote computer system, such as a server. Other standard components of the computer system may be present.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer system may be a server. The computer system may be run on a smart mobile device. The computer program, or portions of the computer program may be linked to other computers or servers running the computer program. The server or servers may be centralized or distributed.

The program may receive, from a payor, one or more payment terms. The payor may transmit the one or more payment terms to the program through any suitable apparatus or method, such as a smart phone, a personal computer, a server, smart glasses, or other devices. The transmission may be over the Internet, through a cellular connection, bluetooth, wi-fi, a local area network, or any other suitable communication protocol.

The one or more payment terms may include, inter alia, an identity of the payer, an identity of the payee, an amount of the payment, a location of one or more assets comprising the payment, one or more options to convey the payment selectable by the payee, as well as other terms. These terms may be encrypted. The one or more payment terms may comprise part of or all of a payment statement.

The program may create a non-fungible token ("NFT"). The NFT may take any appropriate form, including a hyperlink, a pdf, or other digital data. The NFT may be editable. In an embodiment, the program may display the NFT to the payer before transmission so that the payor may confirm all contents.

The NFT may include, inter alia, metadata and a digital envelope. The metadata may include, inter alia, any standard data necessary for the NFT to function as an NFT on a distributed ledger. Different distributed ledgers may require different data.

The NFT may be singular. Some NFTs may have multiple (but limited) copies or may be broken into a finite number of parts (e.g., a wallet may have $\frac{1}{10}^{th}$ of an NFT). However, singular NFTs should have zero copies and may not be divided into parts.

The initial location of the NFT may be within a payor distributed ledger wallet belonging to the payor. A distributed ledger wallet may be a unique address on the ledger that may be accessed by, or belong, to a single person or entity. The payor wallet may be an address on a distributed ledger belonging to the payor. The payor's wallet may be on a single distributed ledger. In an embodiment, the payor's wallet may have access to multiple distributed ledgers (i.e., the wallet may include multiple addresses).

The digital envelope may include data including the one or more payment terms as well as the actual funds that make up the payment.

In an embodiment, the digital envelope may include a graphical user interface ("GUI"). The GUI may include a display of the one or more options to convey the payment. The one or more options may be selectable. The one or more options may be listed vertically, with a box or button to the side of each option that a viewer may select.

In an embodiment, the digital envelope/GUI may include an ability to request a password, PIN, one-time password, or other authenticator from the payee before transferring the payment funds as selected. The authenticator may be a biometric authenticator (such as facial recognition, fingerprint, retinal scan, or other biometric authenticator).

In an embodiment, the funds for the payment may be a cryptocurrency (e.g., a fungible token) or a combination of cryptocurrencies or other digital assets available (other NFTs) on the distributed ledger. In an embodiment, the funds may be a bespoke method of accessing the funds from a standard bank or bank account.

The NFT may include both the payment statement (e.g., the one or more payment terms) as well as the payment itself, allowing the payee to access the statement and payment within one transaction and at the same time, as well as creating an immutable record of the statement on the distributed ledger for historical and other purposes.

The program may request approval from the payor for the contents of the NFT after creation of the NFT. The payor may request changes be made by the program or approve the NFT. The payor may transmit an authorization to the program to release/transmit the NFT. Any suitable communication method may be used. Any suitable authenticator may be used.

After receiving an authorization to transmit the NFT (and/or release the payment) from the payor, the program may transfer the NFT to a payee distributed ledger wallet belonging to a payee. Any suitable or appropriate transmission protocol or method may be used by the program. Different distributed ledgers may have various requirements as to the transfer of an NFT from one address to another address (i.e., from one wallet to another wallet). There may be a transmission cost, payable in cryptocurrency or otherwise, associated with each transfer or transaction.

The program may confirm receipt of the NFT at the payee distributed ledger wallet. As distributed ledgers may be immutable, the transfer of a token, fungible or non-fungible, from one address to another address may be permanently recorded on the ledger. The program may confirm receipt of the NFT by the payee's wallet by querying the ledger.

The program may then convey the payment as instructed by the payee. The NFT may include various options as to how the payee could receive the payment/funds that are included in the NFT. For example, the payee may have the option of transferring the funds into the payee's wallet, another wallet, a bank account or otherwise. In an embodiment, the payee may be able to use the funds within the NFT as collateral for a loan or other financial vehicle. In an embodiment, the payee may be able to use the funds within the NFT to pay off other debts or obligations.

In an embodiment, one or more payment terms or other data, including metadata, within the NFT may be encrypted. In an embodiment, part of or all of the NFT may be encrypted. As tokens and other data on a distributed ledger may be viewable by anyone with access to the ledger (although not modified), encryption may be preferable. A decryption key may be provided separately or within the computer program.

In an embodiment, the payee distributed ledger wallet and the payor distributed ledger wallet may be located on the same distributed ledger. This ledger may be provided by a financial institution or may exist outside of a financial institution. For example, if the payee and payor are customers of the same financial institution, the institution may provide a distributed ledger for its customers to use as a courtesy or paid service. This may decrease transaction costs of transmitting NFTs between different distributed ledgers.

In an embodiment, the payee's wallet and payor's wallet may be located on different distributed ledgers. The program may create an NFT that may be transmitted between the two ledgers, with the appropriate protocols and metadata.

In an embodiment, the distributed ledger may be a blockchain. A blockchain may be more secure and permanent than other types of distributed ledgers.

In an embodiment, the one or more payment terms (statement) or payment may be accessed through a hyperlink within the NFT. For example, the NFT may simply contain a link (hyperlink or otherwise) to the data or a representation of the data (such as a .pdf), instead of, or in addition to including the data within the NFT itself. Hyperlinks may become stale and inaccessible over time.

In an embodiment, the NFT, and/or the data included within the NFT, may be machine-readable. Machine-readable data may be encrypted. Machine-readable data may be in the form of a QR code, barcode, steganography, or other machine-readable format that may be inaccessible or illegible to human eyes.

In an embodiment, the payment redemption computer program and/or the NFT may transmit a report to the payor when certain conditions are met. These conditions may include, singularly or in any combination, inter alia: 1) the digital envelope being viewed (by the payor, the payee, or others); 2) the payment being conveyed to the payee; 3) the failure of the payee to select an option to convey the payment within a pre-determined amount of time; 4) the transfer of the NFT from the payee to a third party; 5) the utilization of the NFT as collateral; 6) when the payment terms (i.e., the statement) is viewed; 7) where the statement is stored (which distributed ledger and where on the ledger); 8) any other information useful to the payor or payee.

In an embodiment, the program may utilize one or more artificial intelligence/machine learning ("AI/ML") algorithms to determine the contents of a report and when to send the report to the payor or payee. For example, if a payor has sent paychecks to 100 employees through an NFT, the program may use AI/ML algorithms to determine that the payor would utilize a report as to when each employee received the NFT and selected an option to convey the payment included with the NFT, along with what option was selected.

In an embodiment, the metadata within the NFT may include a record of where the NFT has been located on the distributed ledger. This metadata may be updated as the NFT moves from address to address on the ledger. This metadata may be encrypted.

A method for utilizing a non-fungible token ("NFT") for payment redemption is provided. The method may include a payment redemption computer program located at a central server. The method may include receiving at the payment redemption computer program, from a payor, one or more payment terms.

The one or more payment terms may include an identity of the payer, an identity of the payee, an amount of the payment, a location of one or more assets comprising the payment, and one or more options to convey the payment selectable by the payee, among other terms.

The method may include the computer program creating a non-fungible token ("NFT") within a distributed ledger wallet belonging to the payor. The NFT may be singular. The NFT may include metadata and a digital envelope. The digital envelope may include data including the one or more payment terms and the payment itself.

The method may include receiving authorization from the payor to transfer the NFT to a payee, and the program transferring the NFT to a distributed ledger wallet belonging to the payee. The method may include confirming, by the program, receipt of the NFT at the payee's distributed ledger wallet.

The method may include the payee selecting one of the one or more options to convey the payment. The payee may also decide not to select any of the available options. When the payee selects one of one or more options to convey the payment, the method may include the program receiving the one or more options from the payee, and conveying the payment as instructed by the payee, according to the selection by the payee.

In an embodiment, when the payee fails to select one or more of the one or more options to convey the payment within a pre-determined amount of time, the method may include returning the digital envelope, or the NFT, to the payor.

In an embodiment, the pre-determined length of time may be 180 days after receipt of the NFT at the payee's distributed ledger wallet.

In an embodiment, the method may include recording, on the distributed ledger, the receipt of the NFT at the payee's distributed ledger wallet.

In an embodiment, the method may include recording, on the distributed ledger, the option selected by the payee, along with other data (such as date and time).

An apparatus for payment redemption utilizing distributed ledger technology is provided.

The apparatus may include one or more computers running a distributed ledger, and a payee computer providing access to a payee distributed ledger wallet address on the distributed ledger.

A payor may transmit one or more payment terms to a payment redemption computer program located at a central server. The one or more payment terms may include: an identity of the payer, an identity of the payee, an amount of the payment, a location of one or more assets comprising the payment, and one or more options to convey the payment selectable by the payee, among other terms.

The payment redemption computer program may create a singular non-fungible token ("NFT") within a payor distributed ledger wallet. The NFT may include metadata and a digital envelope. The digital envelope may include data including the one or more payment terms.

The payment redemption computer program may transfer the NFT to the payee distributed ledger wallet. The transfer may be accomplished automatically or after receiving authorization from the payor.

In an embodiment, the computer program may utilize artificial intelligence/machine learning ("AI/ML") to make the determination as to when to transfer the NFT to the payee's distributed ledger wallet. For example, the program may analyze the contents of the NFT and determine that the date on the statement is today, and therefore transfer the NFT today. Or the program may analyze the past history between the payor and payee and determine that certain payments do not need authorization (e.g., those less than $1,000) while others do need authorization before transfer.

The payment redemption computer program may confirm receipt of the NFT at the payee distributed ledger wallet and record the confirmation on the distributed ledger.

When the payee, on the payee computer, selects one of one or more options to convey the payment, the payment redemption computer program may convey the payment as instructed by the payee.

In an embodiment, the NFT may be encrypted. In an embodiment, the program may include a key to decrypt the NFT.

In an embodiment, when the payee fails to select one or the one or more options within a predetermined amount of time, the NFT may be automatically returned to the payor distributed ledger wallet. In an embodiment, the pre-determined amount of time may be 180 days or any other suitable length of time. The time may be dependent on the type of payment included within the NFT (e.g., checks expire after 180 days) but should be long enough so that the payee has an opportunity to collect the payment. The time may be variable by the program, and the program may determine the length of time through an AI/ML algorithm or algorithms.

In an embodiment, the distributed ledger may be a blockchain.

In an embodiment, the payment redemption computer program may transmit a report to the payor when any the following occurs: 1) the digital envelope is viewed; 2) the payment is conveyed; and 3) any combination of the above. Other triggering events may also be utilized.

In an embodiment, the one or more payment terms may be accessed through a hyperlink within the NFT.

The program may transfer the NFT through the use of a private cryptographic key to the payee's wallet or any other secure and appropriate method. The program may transfer the NFT to the payee's wallet via a (public) cryptographic key while keeping a private version of the cryptographic key hidden and available only to the payor.

In an embodiment, information within the NFT or within the distributed ledger may include a record of where the NFT has been located on the distributed ledger (i.e., which wallet(s)).

In an embodiment, the program may transfer the NFT to a smart contract on a distributed ledger, instead of to the payee's wallet directly. The smart contract may be programmed to perform various functions, including holding the NFT (with its embedded payment) in trust for the payee.

The program may transfer the NFT to the payee's distributed ledger wallet (or a smart contract or other address on the distributed ledger) through the use of a private cryptographic key to the payee's wallet, or any other appropriate method.

The program may transfer the NFT to the payee's distributed ledger wallet (or a smart contract or other address on the distributed ledger) via a (public) cryptographic key while keeping a private version of the cryptographic key hidden and available only to the program. Transferring the may be recorded on the ledger. If the ledger is a blockchain, the transfer may be data to form a new block on the blockchain. Only the user who has control of the wallet the NFT is in may transfer the NFT.

The wallet holding the NFT may be accessed through a private key and a public key or other appropriate cryptographic method. The private key/public key paradigm may be referred to as a digital signature. A private key/public key paradigm may consist of three or more algorithms: 1) a key generation algorithm that creates or selects a private key and a corresponding public key; 2) a signing algorithm that produces a 'signature' when provided a message and a private key; and 3) a signature verifying algorithm can verify a signature's authenticity when given the message, the public key and signature. The keys generated are not generally reproducible (or guessed) by non-computers and may be stored in various file formats on a computer. The keys may be more secure than standard passwords. The keys may be secured or encrypted with any appropriate encryption algorithm.

In general, the authenticity of a signature generated from a message and private key can be verified by using the corresponding public key. In addition, in order for a private key to be secure, it should be computationally infeasible to generate a valid signature for a party without knowing that party's private key. A password as a private key may be less secure when compared to an extensive code (i.e., a key) that may be located on a file on a computer or storage device.

As the ledger is secure and history cannot be altered, a transfer of the NFT to a different address will be apparent in the ledger. For example, an NFT may be assigned to one address and appear in the payee's wallet. As the NFT is non-fungible, no other copy of the NFT will have appeared on the ledger before transfer to the payee other than the payor, and any copy after assignment may be immediately visible on the ledger. The NFT's location, e.g., in the payee's wallet, is known and appears on the ledger. Any transfer to a different address will appear on the ledger, otherwise the transfer will have been ineffective. In addition, any licit or illicit copies of the NFT will be readily ascertainable by view of the ledger and tracing the NFT back to its original wallet.

In an embodiment, the NFT as a statement and payment together may be implemented within an existing software application. The application may be on a mobile computing device or a personal computing device. In another embodiment, the NFT as a statement and payment together may be implemented within a stand-alone software application on a mobile computing device or a personal computing device.

In an embodiment, the executable instructions may include firmware embedded in hardware, as opposed to software.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with any computing device where the payor or payee may attempt to create and transfer the NFT as well as any server or servers. The communication link may include any necessary hardware (e.g., antennae) and software to control the link. Any appropriate communication link may be used. In an embodiment, the network used may be the Internet. In another embodiment, the network may be an internal intranet.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
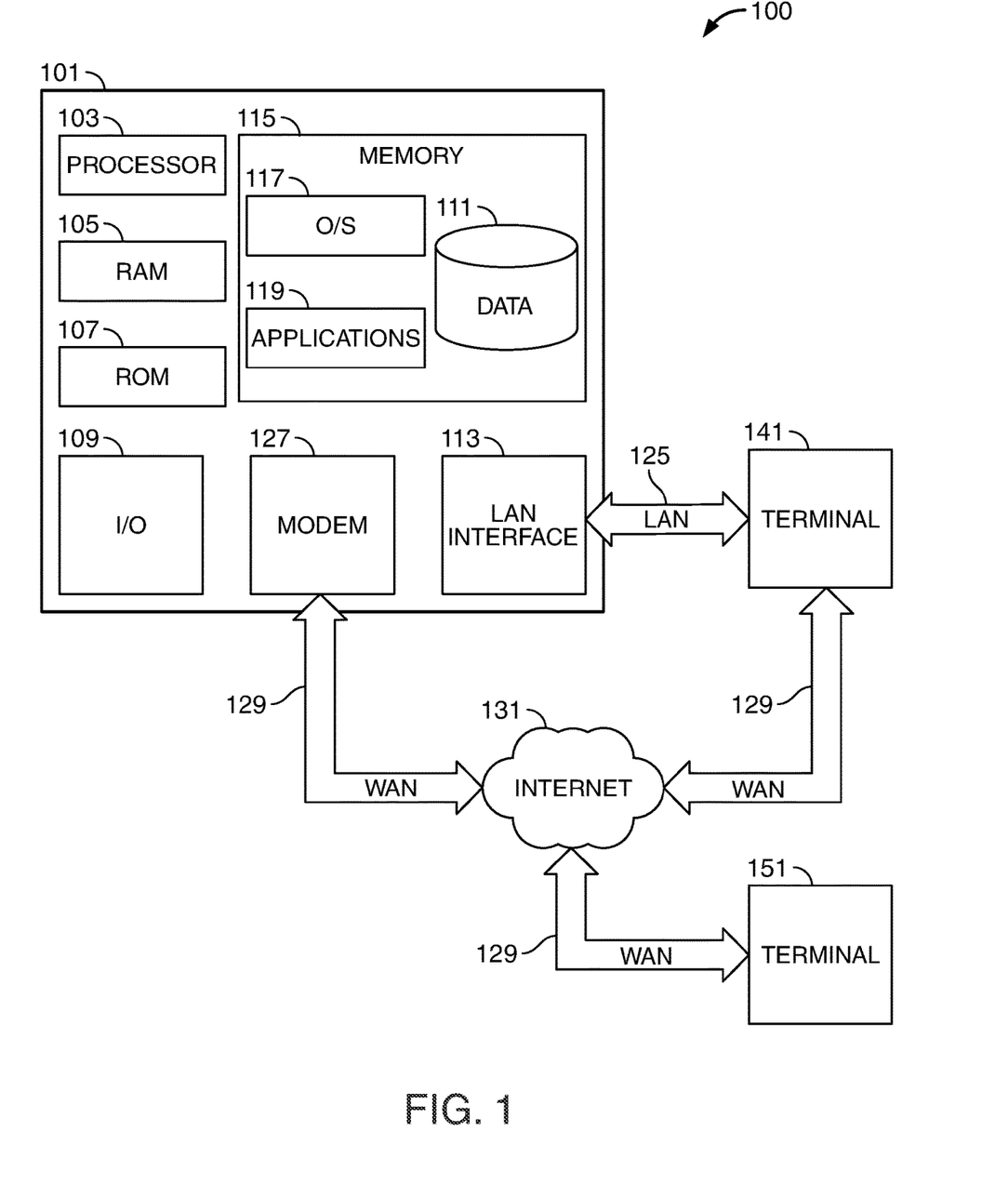
FIG. 1 shows an illustrative apparatus in accordance with principles of the disclosure.

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or a human, such as a payor or payee.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a distributed ledger, user wallets/addresses, NFT payment program, and security protocols.

Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a distributed ledger, user wallets/addresses, NFT payment program) along with any other data 111 (NFT data, ledger data) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a distributed ledger, user wallets/addresses, NFT payment program) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, Computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for distributed ledgers, user wallets/addresses, and NFT payment program(s). In an embodiment, the NFT payment program may use AI/ML algorithm(s). The various tasks may be related to using a distributed ledger and an NFT to remit a payment and statement together.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where the user is interacting with an application for remitting payments and statements.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules maybe located in both local and remote computer storage media including memory storage devices.

Figure 2:
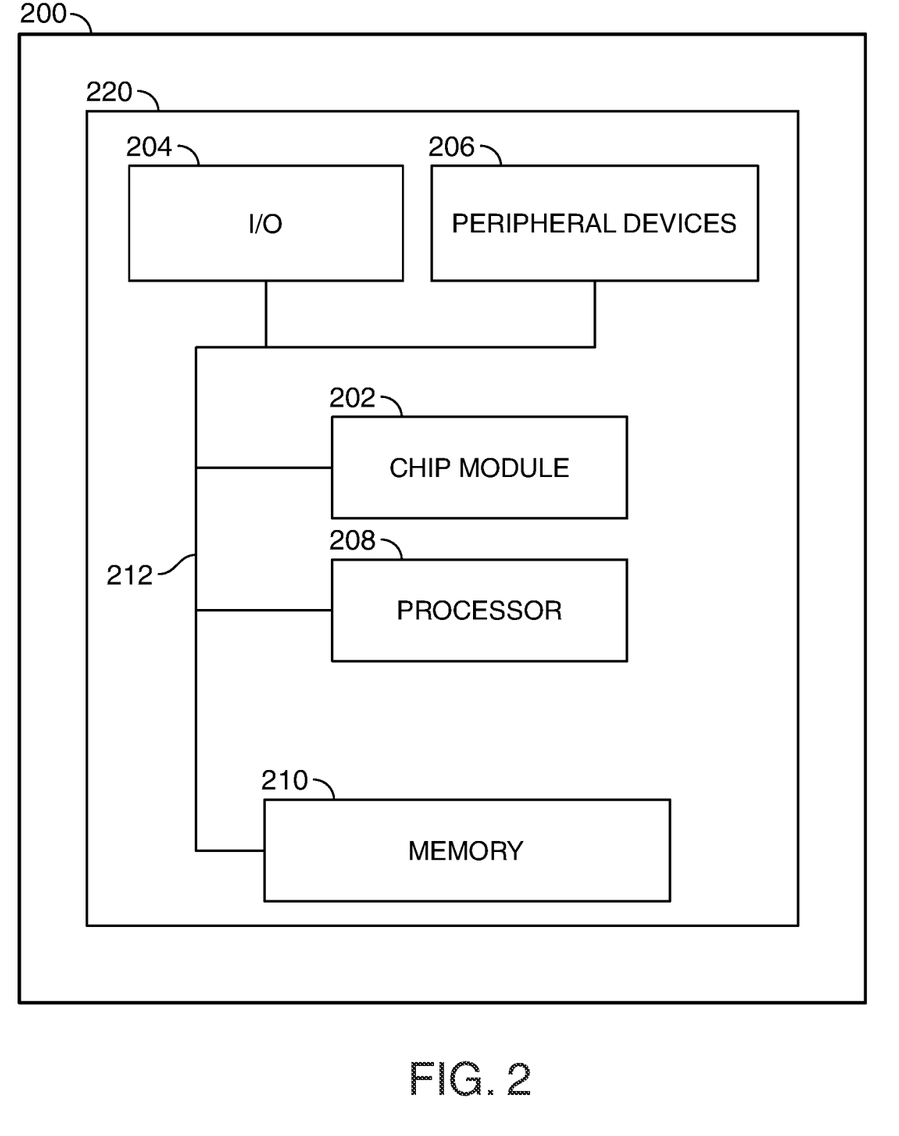
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
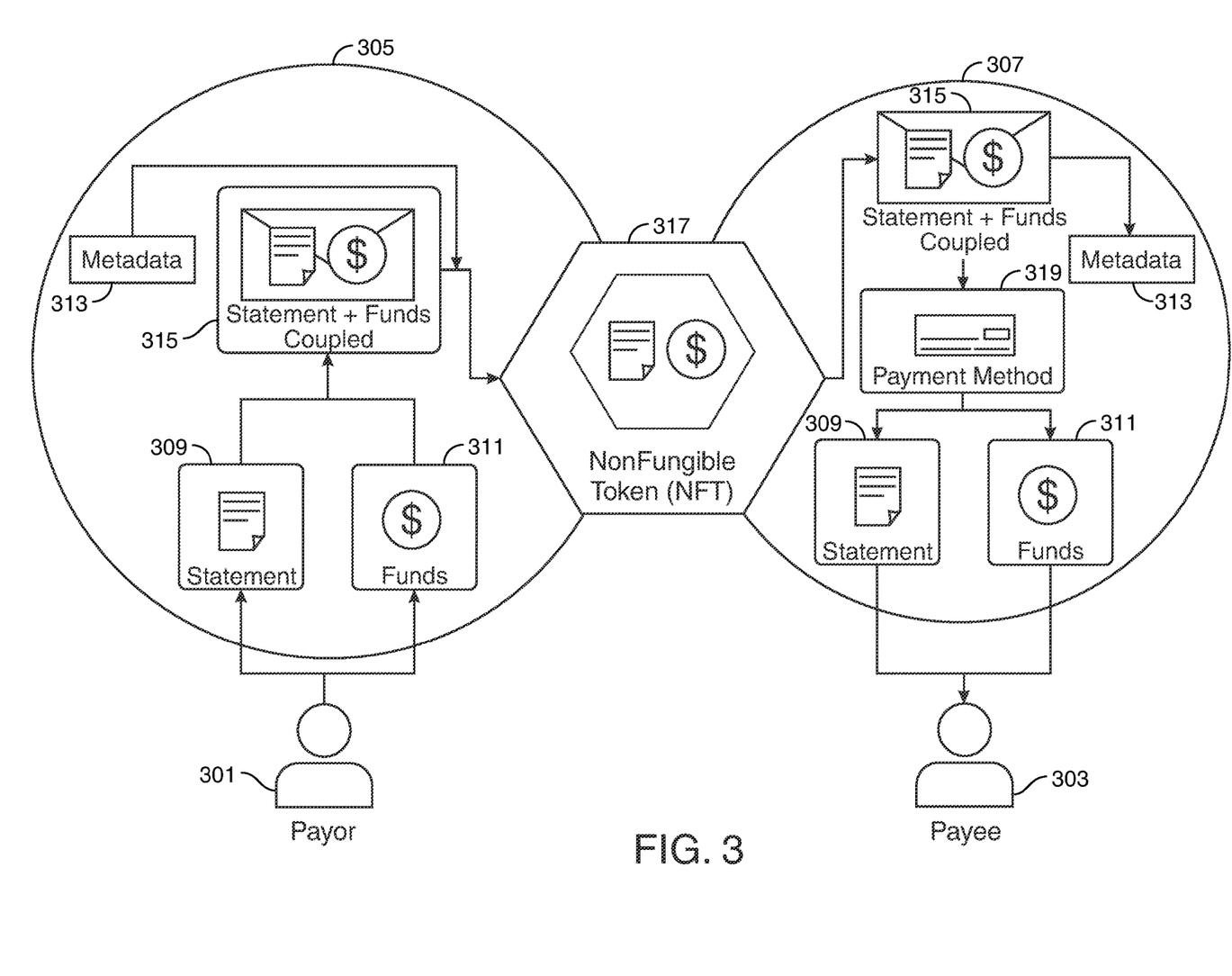
FIG. 3 shows an illustrative schematic in accordance with principles of the disclosure.

FIG. 3 shows an illustrative schematic apparatus in accordance with principles of the disclosure. A payor 301 may have access to a payor digital wallet 305. The payor wallet 305 may be an address on a distributed ledger (not shown). A payee 303 may have access to a payee digital wallet 307. The payee wallet 307 may be on the same or a different distributed ledger as the payor wallet 305.

The payor 301 may authorize a computer program (not shown) to create an NFT 317. The payor 301 may provide a statement 309 including one or more payment terms. Payor 301 may provide funds 311.

The program may couple the statement 309 and funds 311 together to create a digital envelope 315. The program may create an NFT 317 by combining the digital envelope 315 with metadata 313, along with any other suitable or necessary data (not shown).

When authorized by the payor 301, the NFT 317 may be transferred from the payor wallet 305 to the payee wallet 307. Once the NFT 317 is at the payee wallet 307, the payee 303 may select a payment method 319 and receive the funds 311 along with the statement 309.

In an embodiment, the payee 303 may hold onto the NFT 317 without selecting an option for a length of time. In an embodiment, the payee 303 may transfer the NFT 317 to a third party's wallet without selecting a payment option 319 and the third party may select a payment option 319.

Figure 4:
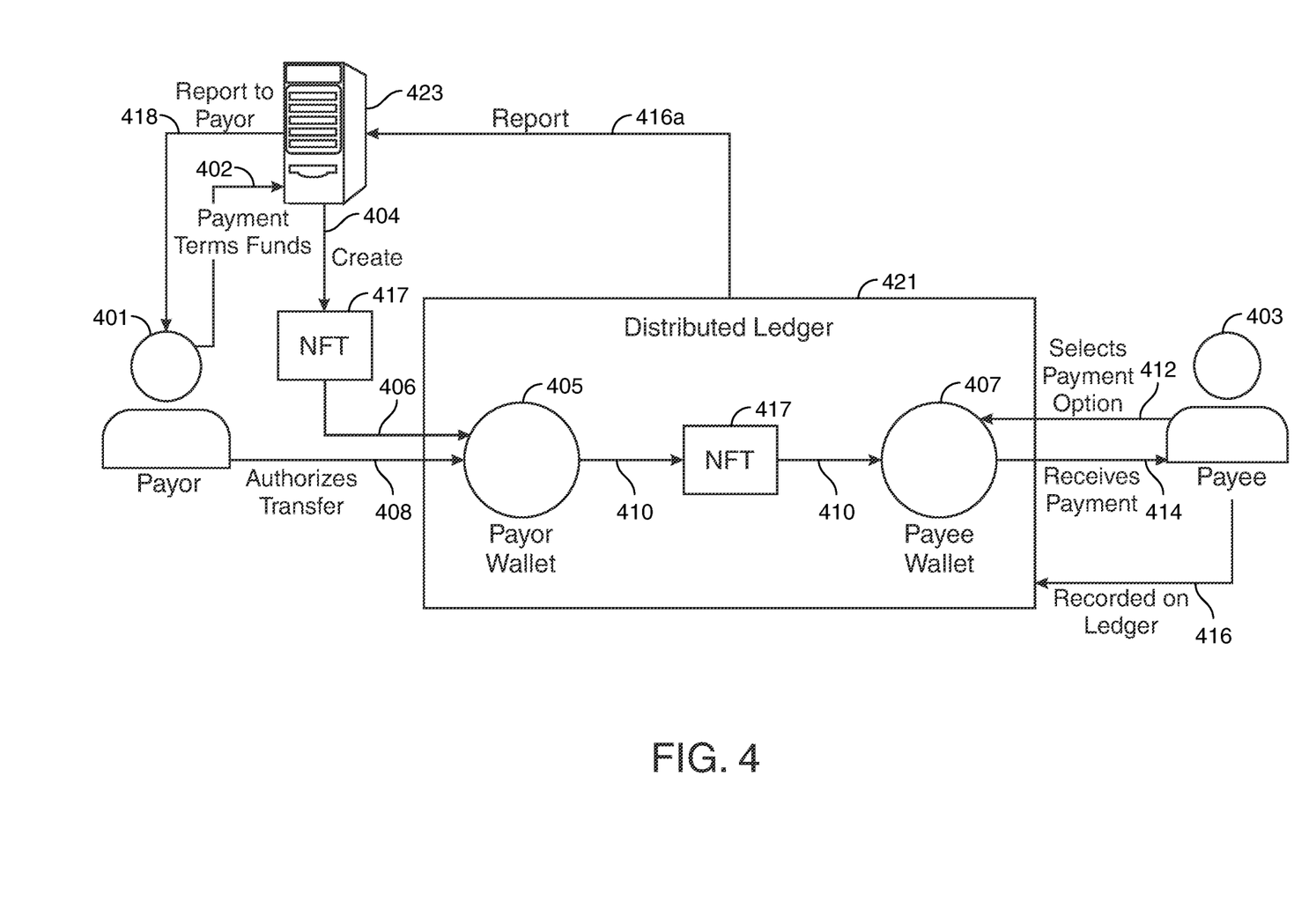
FIG. 4 shows an illustrative schematic in accordance with principles of the disclosure.

FIG. 4 shows an illustrative schematic in accordance with principles of the disclosure. Methods may include some or all of the method steps even-numbered 402-418 on apparatus odd-numbered 405-423, by payor 401 and payee 403. Methods may include the steps illustrated in FIG. 4 in an order different from the illustrated order. The illustrative method shown in FIG. 4 may include one or more steps performed in other figures or described herein. Steps 402-418 may be performed on the apparatus shown in FIGS. 1-3, and 6, or other apparatus.

A payor 401 may transmit one or more payment terms (a statement) and payment funds to program located at a computer 423 at step 402. The program may create an NFT 417 at step 404 and transfer the NFT to a payor wallet 405 at step 406. The payor wallet 405 and payee wallet 407 may be addresses on distributed ledger 421.

Payor 401 may authorize the transfer of NFT 417 from payor wallet 405 to payee wallet 407 at step 408. The NFT 417 may be transferred at step 410. Payee 403 may select a payment option to receive the payment funds at step 412 and may receive the payment funds at step 414. The receipt of the funds and the selected payment option may be recorded on distributed ledger 421 at step 416. This recordation on the ledger may be read by the program and computer 423 after it occurs at step 416a. At step 418, the program may report to the payor 401 the status of the NFT 417 along with the status of the payment statement and payment funds.

Figure 5:
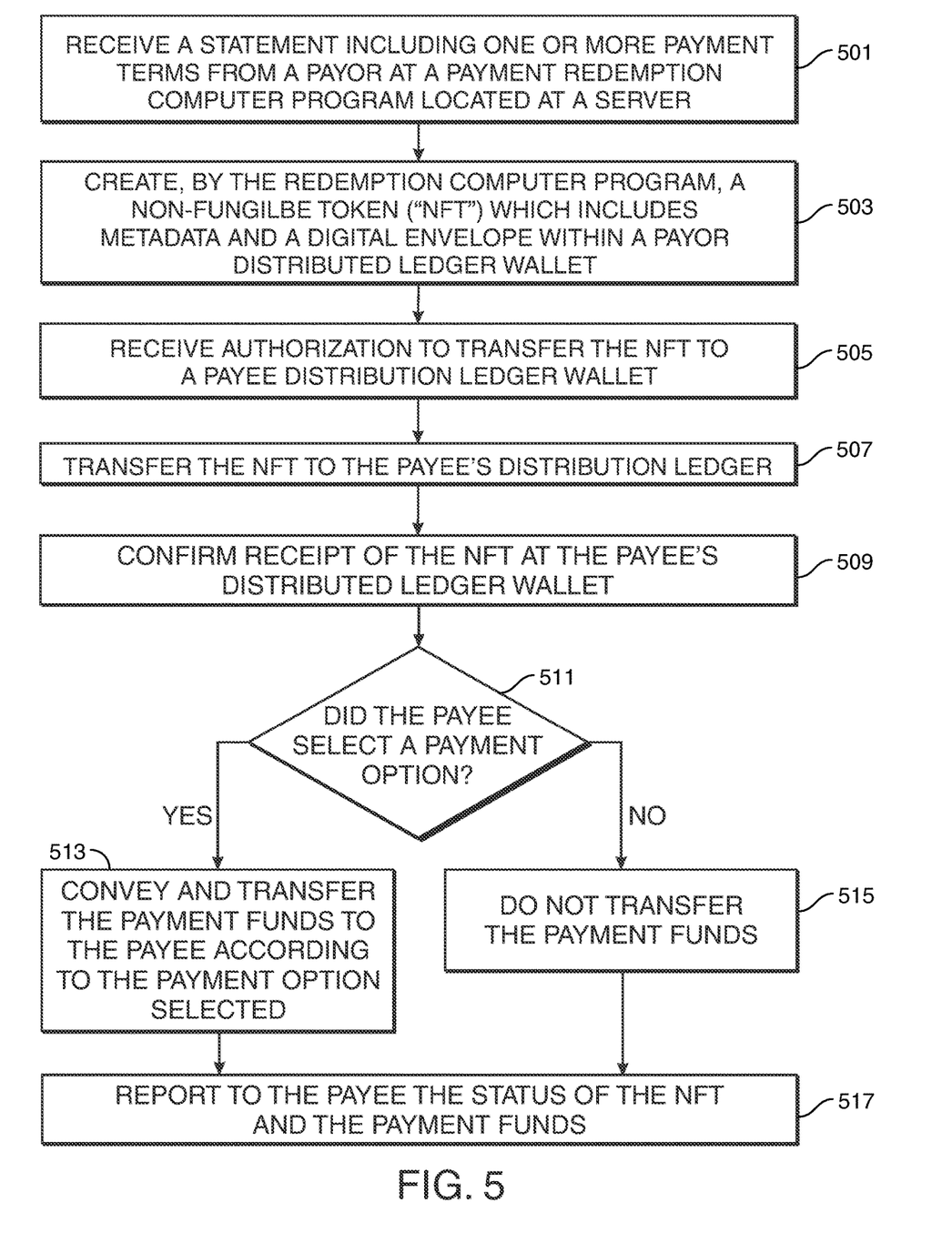
FIG. 5 shows an illustrative flowchart in accordance with principles of the disclosure.

FIG. 5 shows an illustrative flowchart in accordance with principles of the disclosure. Methods may include some or all of the method steps numbered 501 through 517. Methods may include the steps illustrated in FIG. 5 in an order different from the illustrated order. The illustrative method shown in FIG. 5 may include one or more steps performed in other figures or described herein. Steps 501 through 517 may be performed on the apparatus shown in FIGS. 1-3, and 6, or other apparatus.

At step 501, a payment redemption computer program located at a server may receive a statement and payment funds from a payor. The statement may include one or more payment terms, such as: an identity of the payer, an identity of the payee, an amount of the payment, a location of one or more assets comprising the payment, and one or more options to convey the payment selectable by the payee, among other terms.

At step 503, the program may create an NFT within a distributed ledger wallet belonging to the payor. The NFT may include the statement and the payment funds within a digital envelope, as well as metadata and other data. The NFT or its data may be encrypted.

At step 505, the program may receive authorization from the payor to transfer the NFT to a payee distributed ledger wallet. At step 507, after receiving authorization, the program may transfer the NFT to the payee's distributed ledger wallet. And at step 509, the program may confirm receipt of the NFT at the payee's wallet. The confirmation may be accomplished by checking the distributed ledger and its records. The transfer may be recorded in the metadata, on the ledger, or in other locations.

At step 511, the payee may select (or not select) a payment option to receive the payment funds. When the payee selects an option, the payment funds may be transferred and conveyed to the payee at step 513, according to the payment option selected. At step 515, the funds are not transferred when the payee does not select a payment option.

At step 517, the program may report the status of the NFT and/or the payment funds to the payor. Other reports may be generated and transmitted to the payor as requested or as necessary. The reports may be generated at pre-determined intervals (e.g., every day, every week), variable intervals, and/or when a payment option is selected by the payee. The program may read and review the distributed ledger to discover information to include in the report(s), as any action or inaction by the payee with respect to the NFT may be recorded on the distributed ledger.

In an embodiment, the NFT may be returned to the payor's wallet after a pre-determined amount of time when the payee does not select a payment option. For example, a check may be valid for 180 days and if it is not cashed within that time, it is no longer valid, and the funds may be returned to the payor/remitter.

Figure 6:
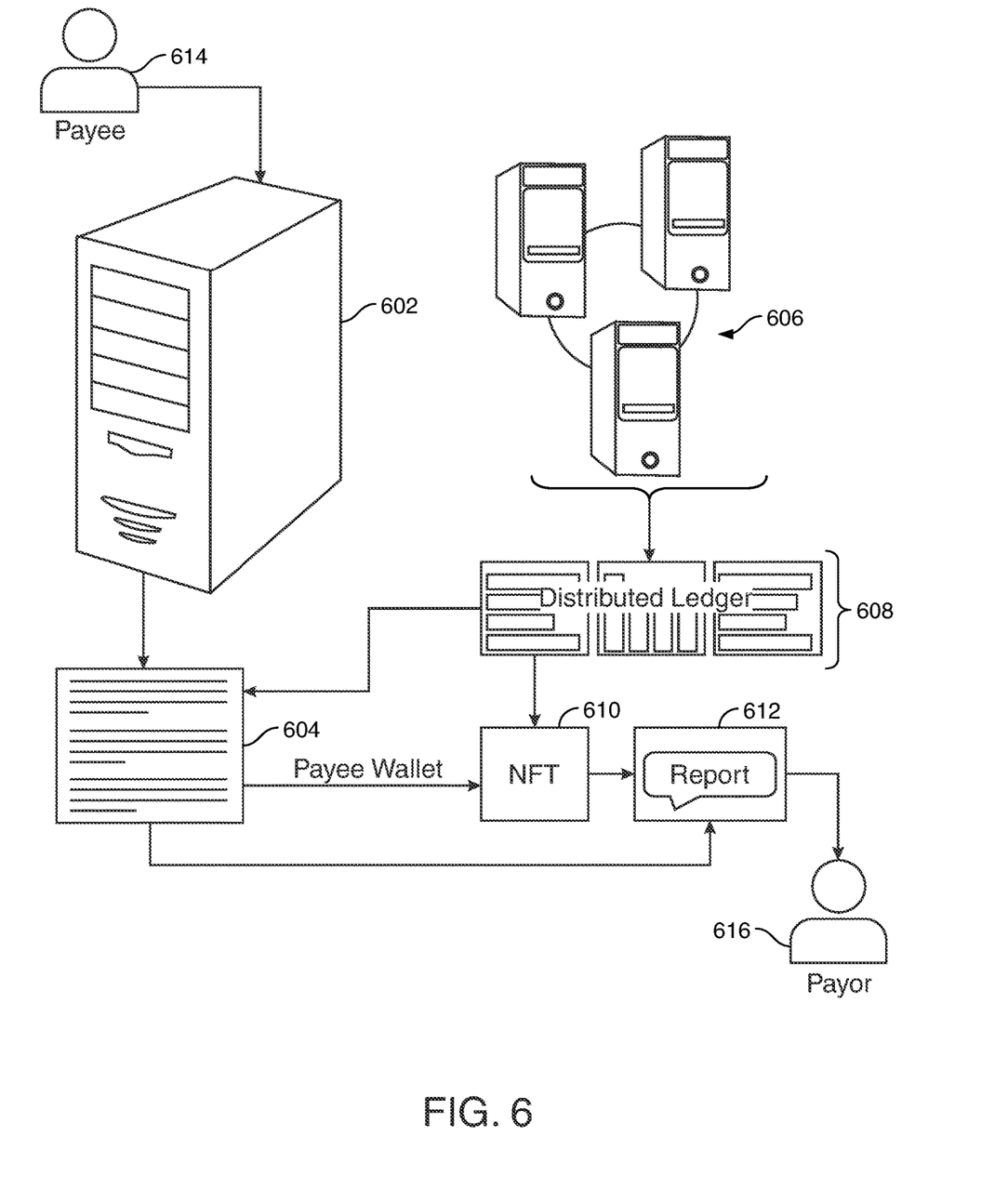
FIG. 6 shows an illustrative apparatus in accordance with principles of the disclosure.

FIG. 6 shows an illustrative apparatus in accordance with principles of the disclosure. A server or payee computer 602 may provide access to a payee 614 to the payee's distributed ledger wallet 604.

Multiple distributed computers 606 may include copies of or run/support a distributed ledger/blockchain 608.

The distributed ledger 608 may include one or more NFTs 610, each NFT 610 including a payment statement and payment funds, as well as metadata and other data (not shown). The payment statement may include one or more payment terms. The payment terms may include: an identity of the payer, an identity of the payee, an amount of the payment, a location of one or more assets comprising the payment, and one or more options to convey the payment selectable by the payee, among other terms.

A payor 616 may create each NFT 610 through a payment redemption computer program (not shown) and transfer the NFT 610 to the payee's distributed ledger wallet 604 from a payor distributed ledger wallet (not shown).

The payee 614 may select (or not select) a payment option to receive the payment funds included in NFT 610.

The payment redemption computer program or the distributed ledger 608 may report 612 various information to the payor 616. Such reports may include confirmation that the NFT 610 is in the payee wallet 604, what the payee 614 selects, when the payee 614 receives the payment funds, as well as other information.

Thus, apparatus and methods for utilizing NFTs for payment remittances are provided. Persons skilled in the art will appreciate that the present invention can be practiced by other than the described embodiments, which are presented for purposes of illustration rather than of limitation.

What is claimed is:

1. A payment redemption computer program product for remitting a payment and a statement together, the computer program product comprising executable instructions, the executable instructions when executed by a processor on a computer system:
receive, from a payor via a computer network, one or more payment terms;
create a non-fungible token ("NFT") comprising metadata and a digital envelope within a payor distributed ledger wallet belonging to the payor, wherein the digital envelope comprises data including the one or more payment terms and the payment;
analyze the NFT;

receive an authorization from the payor via a computer network to transfer the NFT to a payee distributed ledger wallet belonging to a payee;
determine, through one or more artificial intelligence/ machine learning ("AI/ML") algorithms, when to transfer the NFT by analyzing, at least:
the one or more payment terms;
the metadata;
historical data of the payor; and
historical data of the payee;
transfer the NFT to the payee distributed ledger wallet via a computer network;
confirm receipt of the NFT at the payee distributed ledger wallet;
convey the payment as instructed by the payee; and
when the payee fails to select one or more of one or more options to convey the payment within a pre-determined amount of time, return the digital envelope to the payor;
wherein:
the NFT is singular;
the one or more payment terms comprise:
an identity of the payer;
an identity of the payee;
an amount of the payment;
a location of one or more assets comprising the payment; and
one or more options to convey the payment selectable by the payee.

2. The payment redemption computer program of claim 1 wherein one or more of the one or more payment terms are encrypted.

3. The payment redemption computer program of claim 1 wherein the NFT is encrypted.

4. The payment redemption computer program of claim 1 wherein the payee distributed ledger wallet and the payor distributed ledger wallet are located on one distributed ledger.

5. The payment redemption computer program of claim 1 wherein the one or more payment terms are accessed through a hyperlink.

6. The payment redemption computer program of claim 1 wherein the NFT is machine-readable.

7. The payment redemption computer program of claim 1 wherein the NFT transmits a report to the payor when any of the following occurs:
1) The digital envelope is viewed;
2) The payment is conveyed; and
3) Any combination of the above.

8. The payment redemption computer program of claim 1 wherein the metadata further comprises a record of where the NFT has been located on the distributed ledger.

9. A method for utilizing a non-fungible token ("NFT") for payment redemption, the method comprising:
receiving, via a computer network, at a payment redemption computer program located at a central server, from a payor, one or more payment terms;
creating, by the payment redemption computer program, a non-fungible token ("NFT") comprising metadata and a digital envelope within a payor distributed ledger wallet belonging to the payor, wherein the digital envelope comprises data including the one or more payment terms and the payment;
receiving authorization from the payor to transfer the NFT to a payee;
analyzing the NFT;
determining, through one or more artificial intelligence/ machine learning ("AI/ML") algorithms, when to transfer the NFT by analyzing, at least:
the one or more payment terms;
the metadata;
historical data of the payor; and
historical data of the payee;
transferring, via a computer network, the NFT to a payee distributed ledger wallet belonging to the payee;
confirming, by the payment redemption computer program, receipt of the NFT at the payee distributed ledger wallet;
when the payee selects one of one or more options to convey the payment:
receiving the one or more options from the payee; and
conveying the payment as instructed by the payee; and
when the payee fails to select one or more of the one or more options to convey the payment within a pre-determined amount of time, returning the digital envelope to the payor;
wherein:
the NFT is singular;
the one or more payment terms comprise:
an identity of the payer;
an identity of the payee;
an amount of the payment;
a location of one or more assets comprising the payment; and
one or more options to convey the payment selectable by the payee.

10. The method of claim 9 further comprising, when the payee fails to select one or more of the one or more options to convey the payment within a pre-determined amount of time, returning the digital envelope to the payor.

11. The method of claim 10 wherein the pre-determined length of time is 180 days after receipt of the NFT at the payee distributed ledger wallet.

12. The method of claim 9 further comprising recording, on the distributed ledger, the receipt of the NFT at the payee distributed ledger wallet.

13. The method of claim 9 further comprising recording, on the distributed ledger, the option selected by the payee.

14. An apparatus for payment redemption utilizing distributed ledger technology, the apparatus comprising:
one or more computers running a distributed ledger; and
a payee computer providing access to a payee distributed ledger wallet address on the distributed ledger;
wherein:
a payor transmits one or more payment terms comprising: an identity of the payer, an identity of the payee, an amount of the payment, a location of one or more assets comprising the payment, and one or more options to convey the payment selectable by the payee, to a payment redemption computer program located at a central server;
a payment redemption computer program creates a singular non-fungible token ("NFT") comprising metadata and a digital envelope comprising data including the one or more payment terms and the payment within a payor distributed ledger wallet;
the payment redemption computer program analyzes the NFT;
the payment redemption computer program determines, through one or more artificial intelligence/machine learning ("AI/ML") algorithms, when to transfer the NFT to the payee by analyzing, at least:
the one or more payment terms;

the metadata;
historical data of the payor; and
historical data of the payee;
the payment redemption computer program transfers the NFT to the payee distributed ledger wallet;
the payment redemption computer program confirms receipt of the NFT at the payee distributed ledger wallet and records the confirmation on the distributed ledger; and
when the payee, on the payee computer, selects one of one or more options to convey the payment, the payment redemption computer program conveys the payment as instructed by the payee; and
when the payee fails to select one or more of the one or more options to convey the payment within a pre-determined amount of time, the payment redemption computer program returns the digital envelope to the payor.

15. The apparatus of claim 14 wherein the NFT is encrypted.

16. The apparatus of claim 14 wherein when the payee fails to select one or the one or more options within a predetermined amount of time, the NFT is automatically returned to the payor distributed ledger wallet.

17. The apparatus of claim 16 wherein the pre-determined amount of time is 180 days.

18. The apparatus of claim 14 wherein the distributed ledger comprises a blockchain.

19. The apparatus of claim 14 wherein the payment redemption computer program transmits a report to the payor when any of the following occurs:
1) The digital envelope is viewed;
2) The payment is conveyed; and
3) any combination of the above.

20. The apparatus of claim 14 wherein the one or more payment terms are accessed through a hyperlink.

* * * * *